United States Patent [19]
Campbell et al.

[11] Patent Number: 5,264,974
[45] Date of Patent: Nov. 23, 1993

[54] CASSETTE LOADING SYSTEM

[76] Inventors: Kenneth C. Campbell, 197 N. Golden Spur Way, Orange, Calif. 92619; Bunroku Ochi, Garden-heights A. room 202, 1132-1 Kumekubota-cho, Matsuyama-shi Ehime-ken, Japan, 790; Haruhi Nakagawa, 850-13 Yoshihisa Kawauchi-cho, Onsen-gun Ehime-ken, Japan, 791-03; William L. Theobald, 1957 Port Trinity Pl., Newport Beach, Calif. 92660

[21] Appl. No.: 769,036

[22] Filed: Sep. 30, 1991

[51] Int. Cl.$^5$ ............................................. G11B 15/68
[52] U.S. Cl. ...................................... 360/92; 360/71
[58] Field of Search ............ 360/92, 71, 73.01, 74.04; 369/34-38

[56] References Cited

U.S. PATENT DOCUMENTS

| | | |
|---|---|---|
| 3,453,397 | 7/1969 | Miller et al. |
| 3,817,607 | 1/1974 | Anderson |
| 3,860,964 | 1/1975 | Kozu et al. |
| 4,133,013 | 1/1979 | Fisher |
| 4,164,765 | 8/1979 | Gysling ................................. 360/92 |
| 4,561,078 | 12/1985 | Nakayama |
| 4,635,150 | 1/1987 | Kato et al. |
| 4,652,939 | 3/1987 | Baumeister |
| 4,697,215 | 9/1987 | Hata |
| 4,835,634 | 5/1989 | Ostwald |
| 4,839,758 | 6/1989 | Honjoh |
| 4,860,133 | 8/1989 | Baranski |
| 4,918,548 | 4/1990 | O'Donnell et al. |
| 4,954,915 | 9/1990 | Koda et al. |
| 4,993,010 | 2/1991 | Kishimura et al. |
| 5,021,902 | 6/1991 | Ishikawa |
| 5,029,024 | 7/1991 | Leonard et al. |
| 5,045,958 | 9/1991 | Leonard et al. |
| 5,050,020 | 9/1991 | Campbell et al. ..................... 360/92 |
| 5,128,817 | 7/1992 | Herger et al. |
| 5,157,564 | 10/1992 | Theobald et al. ..................... 360/92 |

OTHER PUBLICATIONS

Summus Computer Systems Brochure, "JukeBoxLibrary Model 442/JBL 125 8 mm 125-Gigabyte Mass Archival Storage Subsystem", Feb. 1989.
Data Concepts News, "DAT Stackers-Automated Media Comes of Age". Oct., 1989.

*Primary Examiner*—David P. Porta
*Attorney, Agent, or Firm*—Knobbe Martens Olson & Bear

[57] ABSTRACT

Disclosed is a cassette loading system in a housing having an aperture which delivers a plurality of cassettes one cassette at a time into a cassette drive. The system includes a cassette drive having a cassette acceptor and a cassette magazine mounted through the aperture. The magazine defines a plurality of spaces, with each of the plurality of spaces sized and shaped to receive a cassette. The magazine is also adjustable within the aperture to align each of the plurality of spaces with the cassette acceptor of the drive. The system also include a cassette transfer system which moves each of the cassettes into the acceptor of the drive and retracts each of the cassettes upon ejection by the drive. The transfer system includes a cassette transfer motor which is activated to cause motion which moves a cassette into and out of the acceptor, a plurality of cassette drive wheels which can engage a cassette to move the cassette into the acceptor of the drive and to retract a cassette upon ejection by the drive and an engagement assembly which is activated in order to engage the drive wheels with a cassette in order to move a cassette into the acceptor or to retract a cassette upon ejection by the drive. An engagement assembly for a loader is also disclosed. Additionally, there is disclosed a method of sequentially loading cassettes into a tape drive system using the novel cassette loading system.

38 Claims, 5 Drawing Sheets

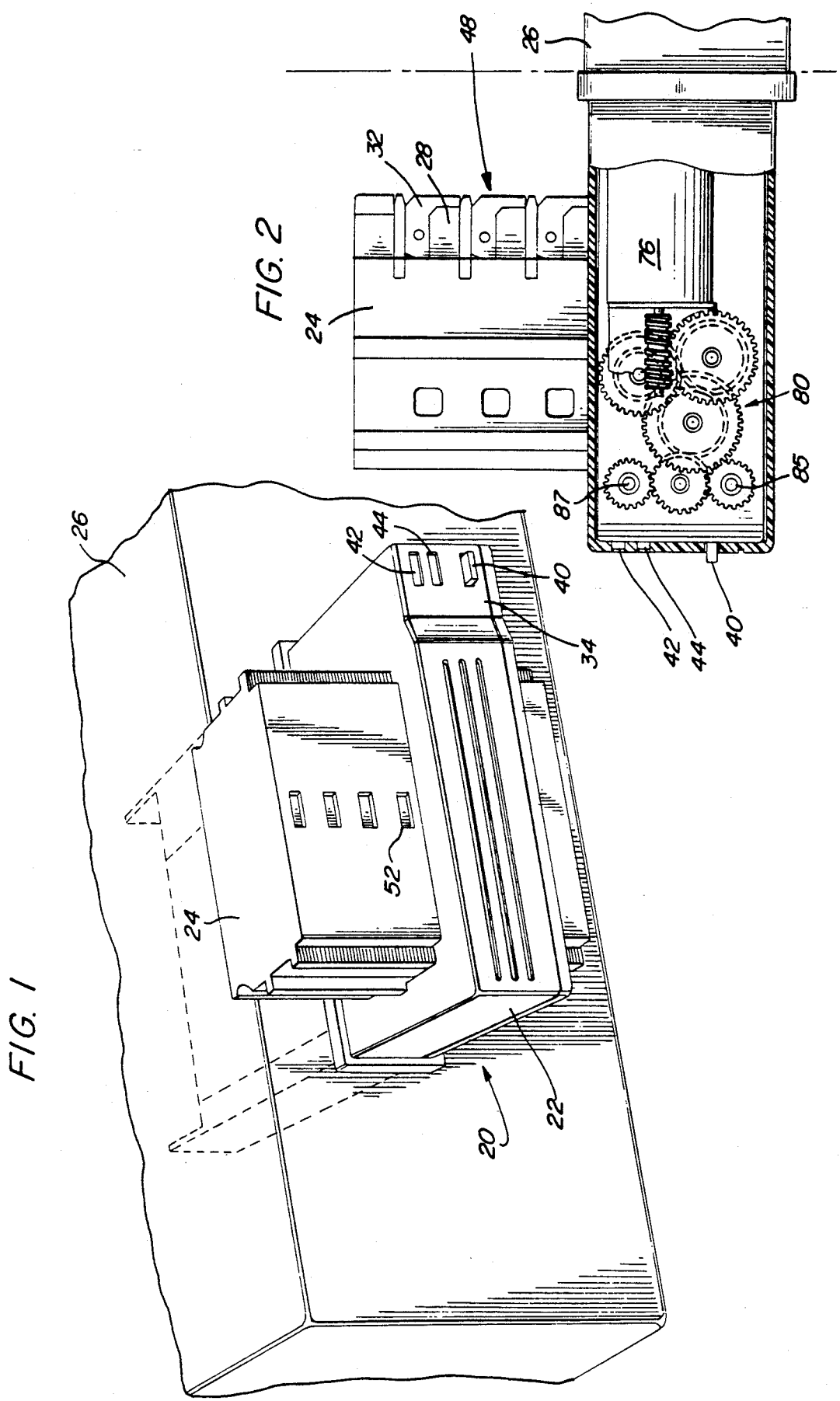

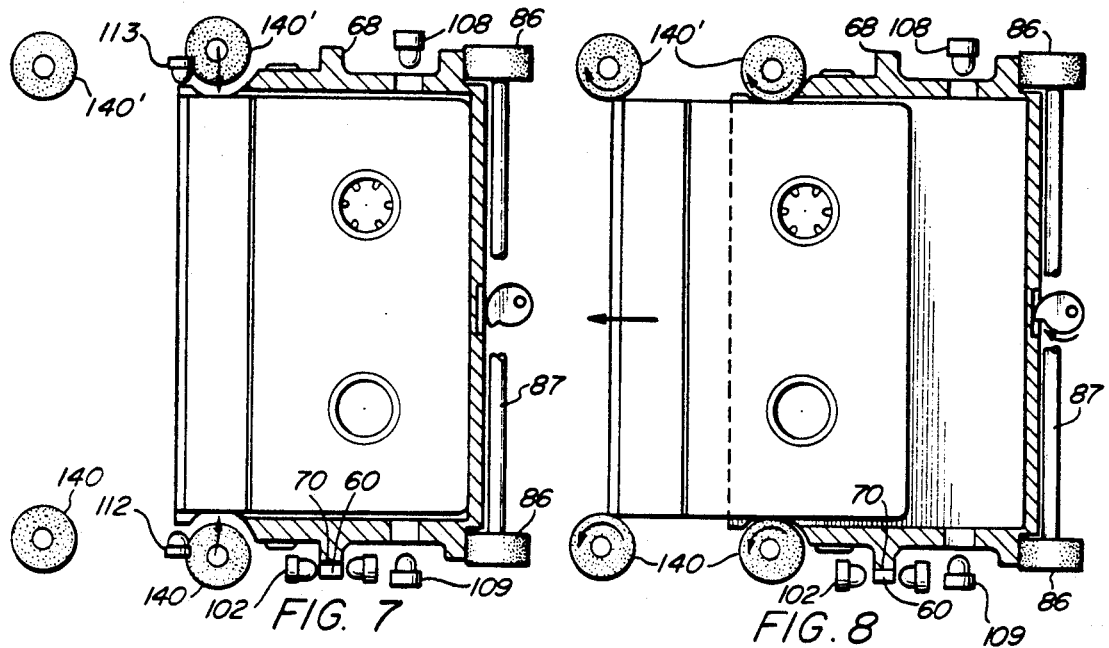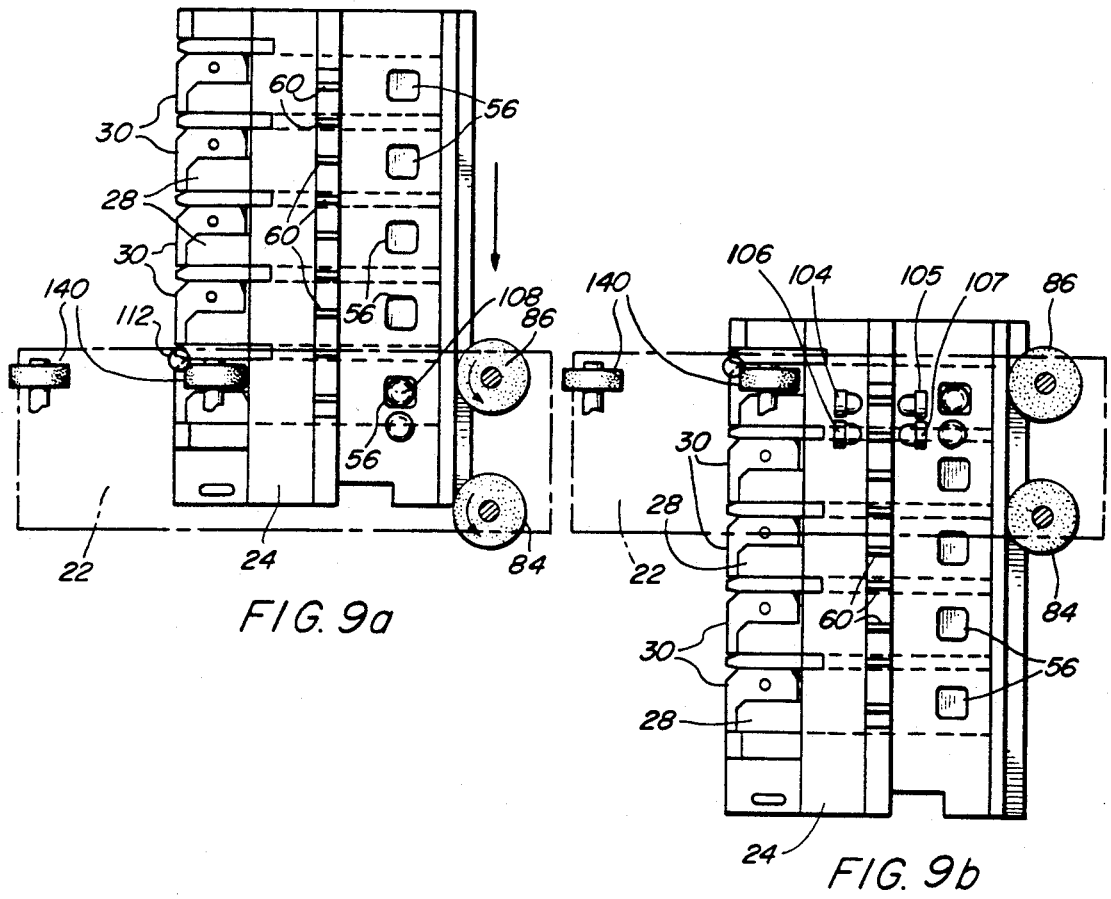

CASSETTE LOADING SYSTEM

BACKGROUND OF THE INVENTION

The present invention relates generally to the field of cassette loaders. More specifically, the present invention relates to loaders which load each of a plurality of cassettes into a cassette drive, sequentially or otherwise.

Most personal and small business computers were originally designed for the use of flexible or floppy disk memories. Accordingly, devices for the unattended loading of floppy disks have been developed for a variety of uses. These devices generally include a hopper wherein the disks are stacked for loading into a disk drive. Generally, these devices have been used for making multiple copies of the same program. The use of these devices for storage of large amounts of data on disks has generally proven unsatisfactory due to the large number of disks involved and the difficulty in retrieving data from them.

To ensure the interchangeability of flexible disk and other drives, an industry standard has been established which requires that such drives be constructed so that they fit within a "full height form factor" (of approximately 3¼ inches (8.3 cm) in height by 5¾ inches (14.6 cm) in width by 8 inches (20.3 cm) in length) or a "half height form factor" (of approximately 1⅝ inches (4.1 cm) in height by 5¾ inches (14.6 cm) in width by 8 inches (20.3 cm) in length).

The 5¼ inch (13.3 cm) tape drive has achieved great popularity for backing up the data of a personal or small business computer, due to its high storage and rapid data access capabilities. However, more recently, tape drives have been developed by Archive Corporation of Costa Mesa, Calif. which store much more data with an even more rapid data access capability, and are marketed under the trademark "R-DAT". Most users prefer internal drives. The increasing standardization of the computer industry requires that these internal R-DAT drives, like all drives, fit within the full or half height form factor described above.

A standard R-DAT tape may hold up to 5.0 gigabytes of data. However, many applications, including archival storage, journaling, on-line and background storage, and the unattended back-up of large amounts of data, may require storage of several times that amount of data. When backing up a data source of more than 5.0 gigabytes, it is necessary to change the R-DAT tape in a R-DAT cassette drive approximately every two hours. Since most such backing up is done outside of normal work hours to avoid tying up the computer holding the data, it is often not convenient to change the R-DAT tape. Thus, there is a need for a cassette loader capable of holding a plurality of R-DAT cassettes for loading automatically into a R-DAT cassette drive.

Devices for loading and unloading multiple cassettes have been developed. However, many of these devices are adapted for use only with certain low storage capability cassettes, such as standard audio cassettes. Moreover, many of these devices are quite large and expensive. Many users do not require such large devices, and cannot afford to pay for them. Other loading/unloading devices include an external cassette drive, resulting in less consumer satisfaction due to their preferences for internal drives and the greater size and expense of the external drives. Thus, there is a need for a small, relatively inexpensive cassette loader which loads cassettes into an internal tape drive.

Recently, Predator Systems Corporation announced the development of the Data Hawk I, a 4 mm DAT stacker holding eight DAT cassettes for loading and unloading to a 4 mm DAT cassette drive. The Data Hawk I has a load/unload cycle time of over 15 seconds and has an anticipated end user price of approximately $4000. The long cycle time and relatively high price of the device may prove unacceptable to many users. Thus, there remains a need for an inexpensive automated cassette loader with a short load/unload cycle.

SUMMARY OF THE INVENTION

The present invention comprises a cassette loading system for a drive. The present invention includes a loader defining a magazine aperture, a cassette magazine, an assembly for aligning and moving the magazine, and an assembly for moving the cassettes to and from the magazine. The magazine is mounted within the aperture and at least partially defines a plurality of spaces. Each of the spaces is sized and shaped to receive a cassette. The magazine includes supports for supporting a cassette within each of the spaces. The magazine drive assembly of the loader selectably aligns each of the spaces of the magazine with the cassette aperture of the drive using magazine drive wheels. Another set of drive wheels are mounted in the loader and insert a cassette positioned within one of the spaces to the acceptor of the drive so that the acceptor receives the cassette. The cassette drive wheels also retract the cassette back into the magazine when the acceptor of the drive ejects it.

In one aspect of the present invention, there is provided a cassette loading system, in a housing having an aperture, which delivers a plurality of cassettes one cassette at a time into a cassette drive. This system includes a cassette drive having a cassette acceptor, a cassette magazine, and a cassette transfer system which moves each of the cassettes into the acceptor of the drive and retracts each of the cassettes upon ejection by the drive. The magazine is mounted through the aperture, and defines a plurality of spaces, with each of the plurality of spaces sized and shaped to receive a cassette. The magazine is also adjustable within the aperture to align each of the plurality of spaces with the cassette acceptor of the drive. The transfer system includes a cassette transfer motor which is activated to cause motion which moves a cassette into and out of the acceptor, a plurality of cassette drive wheels which can engage a cassette to move the cassette into the acceptor of the drive and to retract a cassette upon ejection by the drive, and an engagement assembly which is activated in order to engage the drive wheels with a cassette in order to move a cassette into the acceptor or to retract a cassette upon ejection by the drive. Preferably, the transfer system additionally comprises a cassette drive wheel gear train and a timing belt to transfer the motion generated by the motor to at least one of the drive wheels. In this embodiment, the cassette drive wheel gear train preferably transfers motion generated by the motor at a final gear ratio of approximately 200:1 or higher. In one particular embodiment, the motion of the motor is in a first direction to move a cassette into the acceptor and in a second, opposite direction, to retract a cassette upon ejection by the drive. The drive preferably includes a cassette presence sensor which signals the tape drive and loader regarding the cassette transfer status, a cassette-in-magazine sensor which checks for the presence of a cassette in each of the plurality of spaces, and a cassette orientation sensor which determines if a cassette is inserted properly into each of the spaces if present therein. The loader and drive preferably form an integral component and the cassette loading system obtains power from a host computer system power supply. Each space in the magazine preferably includes a cassette retainer clip. The magazine preferably includes a vertical flange disposed along a side thereof for guiding and the magazine through the aperture or for locating the position of the magazine, and also includes a plurality of cut outs which serve as flags for magazine location. A linear displacement assembly mounted in the loader for moving the magazine within the aperture is also preferably provided which preferably includes a motorized gear train culminating in a magazine drive wheel. The train is preferably driven by a magazine drive motor which transfers motion to the magazine drive wheel at a final gear ratio of approximately 200:1 or higher. The system also preferably includes a bearing surface having associated rollers, wherein there are at least two drive wheels and wherein the magazine drive wheels provide a force mirrored by the rollers. In one particular embodiment, the drive wheels comprise radial slits which provide additional traction when the wheels engage the magazine.

In another aspect of the present invention, there is provided a loader for loading one or more cassettes into a cassette drive having a cassette acceptor, the loader being of the type having a magazine aperture and a magazine having a plurality of spaces therein mounted through the aperture, the magazine being adjustable within the aperture to align each of the plurality of spaces with the cassette acceptor on the drive, the loader comprising an engagement assembly and a plurality of cassette drive tires for moving a cassette mounted in a space within the magazine into the acceptor of the drive and for retracting a cassette upon ejection by the drive. In this aspect of the invention, the engagement assembly comprises an engagement solenoid having a solenoid piston which is outwardly movable in a transverse direction in response to activation of the solenoid, a link plate having a narrow slot thereon, the plate being fixedly attached to the piston, so that transverse motion of the piston causes transverse motion of the link plate, a bell crank rotatably attached to the link plate, a swing arm to which a drive wheel is rotatably mounted, and a planetary gear shaft extending through the narrow slot so that the shaft is free to slide within the slot on the link plate. The loader preferably has at least two link plates, swing arms and planetary gear shafts, and additionally comprises a cassette transfer motor which powers the engagement assembly. In one embodiment of the loader, there is also a cassette transfer gear train to transfer power from the transfer motor to the engagement assembly.

In still another aspect of the present invention, there is provided method of loading each of a plurality of cassettes into a cassette drive having a cassette acceptor, comprising: (a) loading a cassette into each of two or more spaces in a magazine which is mountable through an aperture in a loader, (b) mounting the magazine through the aperture, (c) moving the magazine within the aperture to a position where one of the cassettes loaded in the magazine is roughly aligned with the cassette acceptor, (d) more accurately aligning the one of the cassettes with the cassette acceptor through performing an up-and-down alignment sequence on the magazine, (e) transferring the cassette into the cassette acceptor. Preferably, the method also includes (f) ejecting the cassette from the cassette drive, and repeating steps (c) through (e) for another cassette. In a preferred form of the method, the loader includes a magazine drive motor which can be operated at a low speed and a high speed, and step (c) comprises operating the motor at the high speed and step (d) comprises operating the motor at the low speed. When this method is performed, preferably, the magazine comprises flags to identify the location of the magazine, additionally comprising determining the location of the magazine by sensing the location of the flag. These flags preferably comprise cut outs on the magazine and the loader includes an LED/phototransistor combination, and the determining step comprises detecting the position of the magazine by detecting the presence of one of the cut outs through the LED/phototransistor combination. More preferably, there are two LED/phototransistor combinations, and the determining step comprises moving the magazine up and down until each of the LED/phototransistor combinations detects the presence of one of the cut outs. In another preferred form of the method, the loader includes cassette transfer drive wheels and step (e) comprises engaging the one of the cassettes with the drive wheels.

BRIEF DESCRIPTION OF THE DRAWINGS

FIG. 1 is a perspective front view of a cassette loading system of the present application attached to the front of a typical tape drive assembly.

FIG. 2 is a right side partial sectional view of the cassette loading system.

FIG. 7 shows a top view of a tape within the cassette magazine.

FIG. 8 shows a top view of a tape partially inserted from the cassette magazine into a tape drive.

FIG. 9a shows a full cassette magazine after insertion into the loader. FIG. 9b shows the full cassette magazine of FIG. 9a after the magazine has descended to its lowest position within the loader.

DETAILED DESCRIPTION OF THE PREFERRED EMBODIMENT

Figure 3:
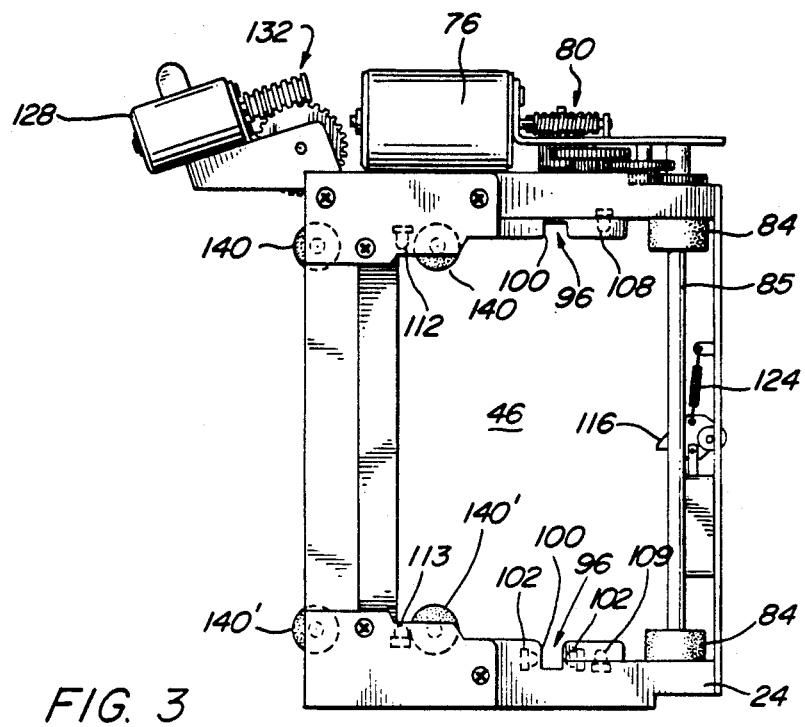
FIG. 3 is a top view of the cassette loader mechanism with the housing cover removed.

Referring now to the drawings in detail, wherein like reference numerals designate like elements throughout the several views and representations thereof, there is shown generally at 20 in FIG. 1, a cassette loading system embodying the present invention in a preferred form. The cassette loading system 20 comprises a tape drive 26, a loader 22 rigidly mounted horizontally to the tape drive 26, and a cassette magazine 24 disposed within an aperture 46 in the loader 22. The magazine 24 is vertically adjustable within the aperture 46 relative to the loader 22. Advantageously, the loader 22 of this embodiment is compatible with the internal configuration of the Archive Python ("Archive" and "Python" are trademarks of Archive Corporation of Costa Mesa, Calif.) R-DAT tape drive 26. The loading system 20 and compatible software is advantageously designed to function in IBM PC/AT/PS2 computer systems, hardware generic clones and SCSI machines that comply with the loading system 20 specifications. In the preferred embodiment, the loading system 20 is formed as an integral component of the drive, with the entire system fitting within a standard 3.5 inch form factor. However, the cassette loader 22 shown by this embodiment of the invention may be adapted to attach to any front loading tape drive compatible with a full or half height 3.5 inch form factor which incorporates a standard cassette acceptor 27 (i.e., a mechanism for accepting a cassette 28 for engagement of the cassette 28 with the read/write head of the drive). Furthermore, those skilled in the art will appreciate that the advantages of this drive are not limited in application for use with any particular drive or form factor.

The cassettes 28 used with the preferred embodiment are standard digital audio tapes (DAT) able to record non-audio signals, and are well-known in the art. Such cassettes 28 are similar to typical video cassettes, in that a dust door 32 is provided for protection. The dust door 32 is rotatably mounted on an edge of the cassette 28 facing the tape drive 26. Upon insertion into a tape drive aperture 33, and reception by the cassette acceptor 27, the dust door 32 is raised, exposing the tape ribbon within. On the top edge of the dust door 32 a chamfer 34 is molded. The function of this chamfer 34 within the context of the present invention will be made apparent hereinbelow.

Any front loading tape drive 26, as discussed above, may be adapted for use in the cassette loading system 20 of the present invention. A cassette presence sensor 34 in the drive 26 is typically disposed just inside the tape drive aperture 33 to detect the presence of a cassette 28 at this location and relay the information to the tape drive 26. A non-standard wire connection 35 is used to relay the same information to the cassette loading system 20. This sensor 34 is in electrical connection with a loader microprocessor board (not shown) where the signals are processed. Control and data interface between the drive system 26 and the loader 22 is preferably by means of a standard SCSI interface. The electrical interface between the drive system 26 and the loader 22 is via an asynchronous serial port. The tape drive firmware will function as a command path for the loading system 20 for loader 22 related SCSI command and status information.

In one embodiment, where the loader 22 is separate, rather than integral with the drive 26, the loader 22 presents a generally rectangular face to the tape drive 26. When this type of embodiment is mounted, the front bezel (not shown) of the tape drive is removed. The rear of the loader 22 is adapted to mount in the place of the removed front bezel.

As used herein, the "rear" of the loader 22 is the side which mounts to the tape drive 26, and the "front" is the side facing out and away from the tape drive 26. Advantageously, all of the components of the cassette loading system 20, except for a cassette magazine 24, fit within the 1⅝ by 5¼ inch (4.1 by 14.6 cm) space of the half height form factor.

As seen in FIG. 1, in the preferred embodiment, the functions of the operator panel of the tape drive 26 are incorporated into the front panel 38 of the cassette loading system 20. These features include an eject button 40, a drive status LED 42, and a cassette status LED 44. The eject button 40 will be pressed when it is desired to remove the magazine 24, for example, a five cassette magazine 24, from the cassette loading system 20. The eject button 40 is also pressed when a magazine 24 is being loaded to start the loader 22 initialization procedure. The LEDs may be of any color, and preferably, have a 40 degree angle and are 50-100 mcd. As an optional feature, an audio jack may also be provided on the front panel 38 as an output for connecting the tape drive 26 with a device to transform the digital output of the drive to analog for playback of recorded audio materials.

The tape drive 26 and cassette loader 22 combination, may be mounted in any of three positions, including horizontally as shown in FIGS. 1 and 2, or with either the left or right side facing upward. The cassette loader 22 does not function well in the upside-down position. The description herein, corresponding to the accompanying drawings, refers to the horizontally mounted cassette loader 22 shown. In this configuration, the cassette loading system is preferably mounted to a tape drive 26 which has sufficient distance above the table top to allow translation of the magazine 24 in the vertical plane without hitting the table top. Alternatively, the loader 22 can be mounted in such a way that the magazine 24 extends beyond an edge of the table top to allow the magazine 24 to be translated below the level of the table top. Whichever orientation, the loader 22 will not extend farther than 3.62 inches out from the front surface of the tape drive 26.

In the preferred embodiment, the cassette loading system 20 obtains its power from the host computer system power supply. The power supplied is either 5 VDC at 0.5 amps maximum current, or 12 VDC at 0.25 amps standby and 1.0 amps with the motor running. The interface to the system power may be obtained through a standard keyed four-pin molex type connector from the cassette loader 22 which may, advantageously, be routed internally through the tape drive 26. Alternatively, power may be obtained from an external power supply. Advantageously, the only other electrical connection to the drive required is to the cassette presence sensor 34, as described above.

As shown in FIGS. 1 and 2, the magazine 24 may be constructed of rigid molded plastic, or of any other suitable material. The magazine 24 defines a plurality of slots 48 each of which is capable of holding one cassette 28. Preferably, the magazine 24 may contain one or more cassettes 28. More preferably, the magazine 24 of the preferred embodiment described above may accommodate between four and twelve cassettes 28. The slots 48 are only slightly wider than the width of the cassettes 28, so as to minimize the size of the magazine 24 and to prevent excess motion of the cassettes 28 therein. The magazine 24 is inserted into the loader 22 so that the slots 48 present a full profile to the rear of the magazine 24, or towards the tape drive 26. The loader 22 manipulates the magazine 24 vertically to align cassettes 28, disposed within the slots 48, with the tape drive aperture 33. The front, or side facing away from the tape drive 26, of the magazine 24 contains an array of locking holes 52, corresponding to each slot 48, into which a locking means is inserted, as described in more detail below. Cassette present through-holes 56, shown in FIGS. 7 and 8, corresponding to each slot 48 in the magazine 24, define unobstructed paths across the transverse dimension of the magazine 24 for which purpose will become apparent further on.

When a cassette 28 is inserted into the magazine slot 48, a cassette retainer clip in the slot 48 holds the cassette securely within the magazine 24. The retainer clips can comprise tabs 66 located anywhere along the front of the slot 48. Advantageously, the cassettes 28 are locked into the magazine 24 during operation. The orientation of the slots 48, towards the drive system 26, blocks the removal of the cassettes 28 until the magazine 24 is unloaded.

Referring to FIGS. 2 and 3, vertical flanges 68, 70 are disposed along either side of the magazine 24 and may be formed of the same material as the magazine 24. One guide flange 68 is solid while the other locating flange 70 includes horizontal cut-outs 60 at evenly spaced positions along its length corresponding to each cassette slot 48. The cut outs 60 serve as flags for magazine location sensing means 102 which are located within a generally C-shaped flange channel 96 in the right side of the loader 22, as best seen in FIG. 3 and described below.

As best seen in their correct positions within the magazine aperture 46 in FIG. 7, and in operative positions relative to the magazine 24 in FIGS. 9a and 9b, there are advantageously three sensing systems mounted in the loader 22. The magazine location sensing system 102 preferably comprises LED emitters and light sensing phototransistors, or may comprise any other type of sensors known by those of ordinary skill in the art. In the preferred embodiment, the magazine location sensing system includes a primary LED 106 working in conjunction with a primary phototransistor 107, and a secondary LED 104 working in conjunction with a secondary phototransistor 105. In this embodiment, the primary sensors 106, 107 are disposed slightly below the secondary sensors 104, 105 within the flange channel 96. The primary 106, 107 and secondary sensors 104, 105 work in conjunction so that when both sets of sensors are activated, the magazine 24 will be at a position within the relatively narrow tolerance in which a cartridge positioned therein can be inserted into the drive or a cassette from the drive can be retracted back into the slot 48 in the magazine 24. The magazine location sensing system 102 is in electrical connection with a loader microprocessor board where the signals are processed. Additional details regarding how the magazine location sensing system can provide precise alignment of the slots 48 in the magazine 24 is provided hereinbelow.

A second set of sensors 108, 109 are located in the inner sides of the loader 22 for determining the status of cassettes 28 within the magazine 24. These sensors 108, 109 are in electrical connection with a loader microprocessor board where the signals are processed. One of these sensors is the cassette-in-magazine sensor LED 108 and the second is the phototransistor 109. The combination of these sensors 108, 109 detects the presence of cassettes 28 within each slot 48 of the magazine 24. When no cassette 28 is present, the cassette present through-holes 56, corresponding to each slot 48 in the magazine 24, allow light to pass from the LED 108 to its associated phototransistor 109. Light passage is blocked, and a signal sent to the loader microprocessor board, when a cassette 28 is present. The cassette-in-magazine sensor LED 108 is mounted in the right side of the loader 22 in a region forward of the C-shaped flange channel 96. The cassette-in-magazine phototransistor 109 is located directly opposite the LED 108 in the left side of the loader 22.

Advantageously, a third sensor set located within the loader 22 determines if each cassette 28 is oriented properly within its slot 48 to prevent insertion of incorrectly positioned cassettes 28 into the drive 26. A cassette orientation LED 112 is located just to the rear of a left side bearing surface 100 and faces transversely across the aperture 46. A cassette orientation phototransistor 113 is located just to the rear of a right side bearing surface 100 directly across from the LED 112. The phototransistor 113 senses light from the LED 112 across the chamfer 30 of the cassette 28. If the cassette 28 is oriented any other way (e.g. upside-down or backwards), light cannot pass from the LED 112 to the phototransistor 113, and an appropriate signal is sent to the loader microprocessor board.

The magazine 24 is aligned with the tape drive aperture 33 by means of a linear displacement assembly mounted in the loader 22. As shown in FIGS. 2 and 3, in the preferred embodiment, the assembly comprises a motorized gear train 80 culminating in two pairs of drive tires 84, 86, positioned in the front corners of the loader 22. The train includes, and is driven by, a magazine drive motor 76 mounted to one side of the loader 22, as best seen in FIG. 3. In the preferred embodiment, the magazine drive motor 76 can operate at 5000 rpm and powers the gear train 80 with a relatively high final drive ratio (approximately 200:1 in the preferred embodiment) in order to move the magazine 24 with relative accuracy. An additional benefit realized from this high gear ratio is that of accurate stopping due to the absence of drift sometimes associated with motors connected to trains having lesser gear reduction. The high gear ratio also allows the motor 76 to reach its full speed quickly, and to operate with less strain. Advantageously, conventional drive motor circuits can be used to operate all of the motors of the present invention.

The magazine 24 is inserted through a similar shaped magazine aperture 46 which extends vertically through the entire loader 22. The aperture 46 and magazine 24 are generally rectangular in cross-section and define a front and rear and two sides. As described above, the magazine 24 is oriented with the openings of the slots 48 to the rear, and the locking holes 52 to the front. The upper 84 and lower 86 set of magazine drive tires contact the front portion of the magazine 24. The lower drive tires 84 rotate on a single axle 85 running transversely across the lower front corners of the aperture 46. The upper two tires 86 also rotate on a single axle 87 running transversely across the upper front corners of the aperture 46. Each axle 85, 87 is gear driven from the side of the aperture 46 which the magazine drive motor 76 and accompanying gear train 80 are disposed. Each pair of tires is disposed relative to each other symmetrically about the front-to-rear centerline of the magazine 24. The drive tires 84, 86 apply a rearward force on the magazine 24 which is mirrored by reactive forces provided by the bearing surfaces 100. The tires 84, 86 yield to the slightly oversized magazine 24 with the interference providing sufficient compression for good tire traction. The bearing surfaces 100 are forward facing vertical ledges. In the preferred embodiment, each bearing surface 100 includes two rollers which help provide smooth operation. The right side bearing surface 100 forms one side of the C-shaped flange channel 96. The bearing surfaces 100 contact the rear surfaces of the vertical side flanges 68, 70 on the magazine 24. Advantageously, the bearing surfaces 100 with rollers allow the magazine 24 to be driven without excess friction and without devoting excess space to the mounting of the magazine 24.

Preferably, the drive tires 84, 86 are constructed from a natural or synthetic rubber material, such as polyurethane, with sufficient yieldability to compress the magazine 24 against the rollers on the bearing surfaces 100 providing non-slip drive action without excess friction against the rollers on the bearing surfaces 100. Also preferably, the drive tire material has a Schorr hardness within the range of approximately 65 to 80. Advantageously, in the preferred embodiment, the tires are relatively smooth, without grooves, to provide very fine control over the motion of the magazine 24.

A further advantage can be accomplished by manufacturing the drive tires 84, 86 with radial slits extending from the outer diameter a substantial distance inward toward the central axle. These slits improve the traction of the tires 84, 86 by allowing radial sections to slide relative to each other upon pressure being applied by the magazine 24. The outer profile of the tires 84, 86 then conforms to a sawtooth shape which enhances traction.

Figure 4:
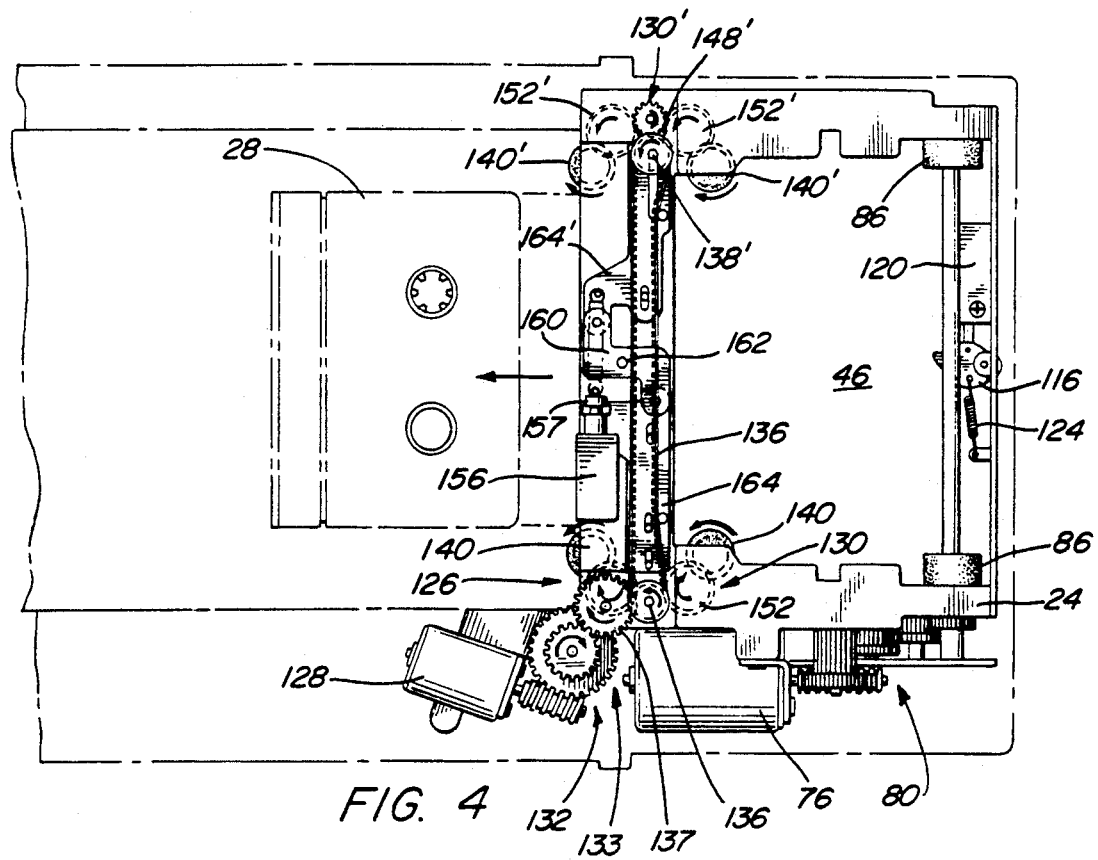
FIG. 4 is a top view of the cassette loader mechanism in relation to a tape drive assembly.

The magazine 24 is vertically adjustable and positioned to present a cassette slot 48 to the tape drive aperture 33. When a particular slot 48 is aligned with the aperture 33, magazine 24 movement is restricted by a magazine lock tab 116 extending into a locking hole 52. The lock tab 116 is pivotally mounted inside the front end of the loader 22, as seen in FIGS. 3 and 4. A magazine lock solenoid 120 actuates the lock tab 116 to its extended position when instructed to do so by the loader microprocessor. A magazine lock spring 124 biases the lock tab 116 towards its retracted position. Advantageously, the loading system 20 of the present invention requires a SCSI software command before the lock tab is retracted and the magazine 24 removed.

As seen in FIG. 3 the loader 22 includes a cassette transfer system 126 which is used to move the cassette 28 into the acceptor 27, and also to retract the cassette 28 when the acceptor 27 ejects it. In the preferred embodiment, the cassette transfer system 126 includes a cassette transfer motor 128, cassette drive wheels 140, 140' and a cassette drive wheel engagement assembly 130, 130'.

The cassette engagement assembly 130 has identical components on both the right and left sides of the loader 22. Accordingly, only the left side assembly will be described. Where necessary for understanding of the operation of the assembly 130, the like-numbered parts on the right side are designated with a prime designation using the same reference number. These right side components have identical structure and function.

Figure 5:
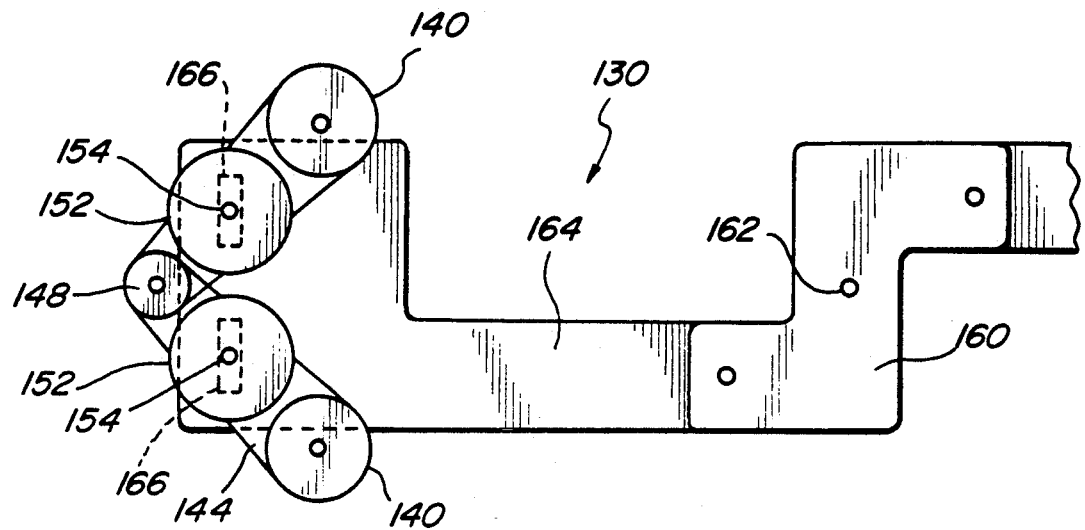
FIG. 5 is a top view of the cassette engagement assembly showing the gears of the left side assembly only.
Figure 6:
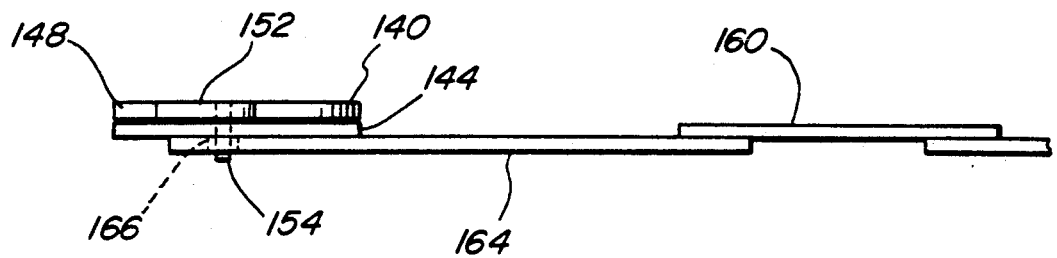
FIG. 6 is a side view of the cassette engagement assembly seen in FIG. 5.

As best seen in FIGS. 5 and 6, the cassette engagement assembly 130 comprises an engagement solenoid piston 157, two swing arms 144, a link plate 164, and two planetary gear shafts 154 whose ends are slidingly disposed within slots 166 in the link plate 164. The left and right link plates 164, 164' are rotatably connected to the ends of a bell crank 160 pivotable about a center point 162 between the two plates 164, 164'.

The engagement solenoid 156 is mounted at the rear end of the loader 22 so that its piston 157 extends in a transverse direction across the loader 22. The assembly also includes a solenoid piston 157 which is fixedly attached to a left link plate 164, and a bell crank 160, rotatably attached to both link plates 164, 164'. In the preferred embodiment, the engagement assembly 130 includes a DC motor that engages a profile cam with a cam follower attached to the left link plate 164.

The bell crank 160 ensures the equal and opposite translation of the two plates 164, 164'. The link plate 164 extends from the bell crank 160 to below the swing arm 144. Both planetary gear shafts extend down through narrow slots 166, 166' in the link plate 164, 164'. The planetary gear shafts 154, 154' are slidingly engaged by the slots 166. Upon outward transverse motion of the link plate 164, both swing arms 144, 144' pivot outward about the shaft 138 due to a moment created by the slots 166, 166' pushing the planetary gear shafts 154, 154' outward. The planetary gear shafts 154, 154' are free to slide within the slots 166 to prevent jamming.

Referring back to FIG. 4, the cassette transfer motor 128 is activated by the cassette transfer motor drive circuit (not shown) after a slot 48 is vertically aligned with the tape drive aperture 33. The cassette transfer motor 128 drives a system of reduction gears 133, covered by a gear plate 134, culminating in a last gear 137. As shown in FIG. 3, the cassette transfer motor 128 and its associated reduction gears 133 are mounted in the rear left corner of the loader 22. The last gear 137 meshes with a pulley gear 135 in non-slip engagement with a timing belt 136 whose inner surface has grooves which mesh with a second pulley gear 135' on the right side of the loader 22. The last gear 137 simultaneously drives the left side sun gear 148 whose function is described below. The right side pulley gear 135' drives the left side sun gear 148' with an intermediate gear 139, of the same diameter and tooth size as the last gear 137, disposed between. This configuration ensures the sun gears 148, 148' turn at the same rate.

The sun gear 148 is keyed to a fixed shaft 138. The swing arms rotate about the shaft 138 defining a V-shape with the apex at the shaft 138 and the open end facing inward toward the aperture 46. A drive wheel 140 is rotatably mounted to the end of each swing arm 144. A planetary gear 152 is rotatably mounted proximate the center of each swing arm 144 in meshing connection with both the sun gear 148 and drive wheel 140. The gear train is such that upon a clockwise rotation of the sun gear 148, both planetary gears 152 turn counterclockwise and the drive wheels 140 turn clockwise. When voltage is applied to the cassette transfer motor 128, the reduction gears 133 will engage, thereby moving the cassette drive wheels 40 with an approximately 200:1 final gear ratio in the preferred embodiment.

The cassette present sensor 34, located near the front of the aperture 27, signals both the tape drive 26 and loader 22 regarding the cassette 28 transfer status. The cassette present sensor 34 may comprise an LED 36 and phototransistor 37 facing each other across the aperture 27, or any other sensing mechanism known in the art. The cassette present sensor 34 is in electrical connection with a loader microprocessor board where the signals are processed. When a cassette 28 is ejected from the acceptor 27, or transferred from the loader 22, the light path is blocked between the LED 36 and phototransistor 37, as represented in FIG. 8, which signals to the loader microprocessor that a cassette 28 is ready to be transferred. The direction of cassette 28 travel is stored in a non-volatile memory device and signalled to the loader 22 to let it know which direction to rotate the cassette transfer motor 128.

To load, the magazine 24 is inserted into the magazine opening and the eject button 40 depressed. This serves as a signal to the magazine drive circuitry to initialize the loading system 20. The drive system 26 electronics will reject a magazine 24, and not initialize it, if there is already a cassette 28 in the drive acceptor 27. The front panel 38 LEDs 42, 44 will commence a blinking sequence in this event. The two-speed magazine drive motor 76 is actuated at its high speed, driving the gear train 80, and moving the magazine 24 downward so that the uppermost, or first cassette slot 48, is aligned with the tape drive aperture 33. As each slot passes through the magazine aperture 46, the cassette-in-magazine sensor 108, 109 checks for the presence of a cassette 28, storing the information in ROM memory, and skipping over that slot 48 later during the cassette 28 transfer procedure. Simultaneously, the cassette orientation sensor 112, 113 checks on the viability of each cassette 28 and signals the loader 22 to stop and eject the magazine 24 if a wrongfully inserted cassette 28 is found.

In the preferred embodiment, the motor 76 continues moving the magazine 24 until the topmost, or first, cut-out 60 is found by the primary LED/phototransistor combination 106, 107. Advantageously, the loader 22 of the present invention will reach the first slot of a four cassette 28 magazine 24 within five seconds. When the first cut-out 60, corresponding to the first slot 48, is found by the primary LED/phototransistor combination 106, 107, the motor 76 is stopped. The first slot 48 of the magazine 24 will be vertically aligned with the tape drive aperture 33 when the cut-out 60 is approximately in line with the primary LED/phototransistor combination 106, 107. A description of the alignment procedure follows below. While in the preferred embodiment, the first cassette 28 to be loaded is the cassette 28 in the slot 48 corresponding to the first cut-out 60, those skilled in the art will recognize that the cassette loading system 20 could operate so that the first cassette 28 loaded can be from any of the slots 48.

As discussed briefly above in connection with the description of the magazine 24, it is desirable to accurately stop the magazine 24 with a particular slot 48 in the same plane as the tape drive aperture 33. This is because variations greater than about ±1 mm could prevent the cassette 28 located in the slot 48 from being accepted by the tape drive 26. Accordingly, an alignment procedure is followed to ensure the cassette 28 will be aligned with the aperture 33. This procedure involves an up-and-down sequence of magazine 24 movements. The magazine location sensing system 102 in the flange channel 96 cooperates with the cut-outs 60 in the locating flange 70, as seen in FIG. 7. The primary 106, 107 and and secondary 104, 105 sensors are positioned such that the cut out 60 corresponding to each slot 48 will allow both the primary 106, 107 and secondary LED/phototransistor combination 104, 105 to be activated when the magazine 24 is properly aligned within the relatively tight tolerance in which insertion or retraction of a cassette can occur.

The motor 76 can shift to a lower speed for the up-and-down alignment sequence for accuracy. The primary 106, 107 sensors are disposed slightly below the secondary sensors 104, 105, so that as the magazine 24 moves below the point at which the slots 48 are aligned, the flange 70 will block the secondary sensors 104, 105 with the primary sensors 106, 107 still being activated. Similarly, as the magazine 24 moves above this position, the flange 70 will block the primary sensors 106, 107 as the secondary sensors 104, 105 remain activated. Thus, in the up-and-down alignment sequence, the magazine will move slightly upward and downward to correct either of these conditions until a condition is reached in which both the primary and secondary sensors are activated.

Each cassette 28 may be selectively located in line with the tape drive aperture 33 and transferred back and forth from the magazine 24 to the tape drive 26. The cassette transfer system 126 is wholly contained in the loader 22. Before a cassette 28 is transferred to the tape drive 26, the cassette engagement assemblies 130 are retracted by the extension of piston 157 of the engagement solenoid 156. In the retracted position, the link plates 164 are at their outermost range, forcing the swing arms 144 outward as well. In this configuration, the cassette drive wheels 140 cannot contact the cassette 28. When a slot 48 is aligned with the aperture 27, the cassette transfer system 126 is activated. The engagement solenoid 156 is tripped, and the piston 157 retracted. The link plates 164 move inward, due to the action of the bell crank 160, simultaneously rotating the swing arms 144 towards the middle. The drive wheels 140 on the ends of the swing arms 144 are now sufficiently inward to be able to contact the sides of the cassette 28.

The cassette transfer motor 128 is activated at this time. The motor 128 engages the reduction gears 133 which terminate in a last gear 137. This last gear 137 is in meshing engagement with the left-side pulley gear 135 and left side sun gear 148. A timing belt 136 transfers rotation to a right-side pulley gear 135'. The right-side pulley gear 135' imparts rotation to an intermediate gear 139 of equal diameter and tooth size at the last gear 137. The intermediate gear 139 then drives the right-side sun gear 148 at the same speed as the left-side sun gear 148. The sun gear 148 imparts rotation to the planetary gears 152 which, in turn, impart motion to the drive wheels 140, propelling the cassette 28 rearward out of the loader 22. A simultaneous and equal rearward force is applied to the right side of the cassette 28 by the engagement assembly 130' on that side.

Automated Operation of the Preferred Embodiment

Referring now to FIGS. 9a through 9d, there is shown a schematic representation of the operation of the automated cassette loading system 20 and tape drive 26 in accordance with the preferred embodiment.

In FIG. 9a, there is shown a representation of a standard magazine 24 loaded with a cassette 28 in each of its five slots. The magazine 24 has just been placed by an operator into the magazine aperture 46, and the eject button 40 depressed. After a short delay, the magazine motor 76 (shown in FIGS. 2 and 3) will have driven the magazine 24 downward. An alignment procedure is activated to accurately stop the magazine 24 with the topmost, or first, slot 48 vertically aligned with the tape drive aperture 33. The cassette 28 then goes through a load/unload sequence detailed below, finally returning to its original position within the magazine 24. In the preferred embodiment, the magazine 24 is moved up one slot 48 at a time. However, in other embodiments wherein the first cassette 28 to be loaded is in other than the topmost slot 48, the magazine 24 may be moved upward or downward, depending on the sequence programmed into the loader control software. In accordance with an improved cassette loading system 20, there can be provided a random access mode to provide access to the cassettes 28 in any order, through the provision of a user interface.

Figure 9C:
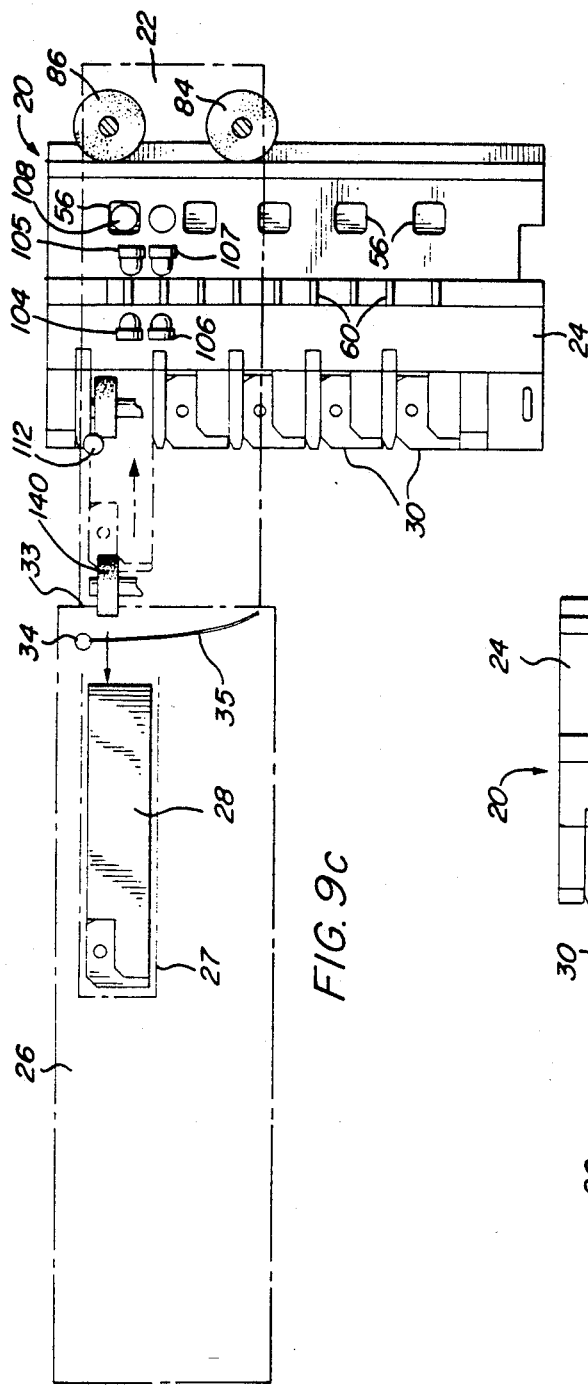
FIG. 9c shows the full cassette magazine of FIG. 9a with the first tape load/unload position within the loader.

The cassette 28 is now ready to be loaded. A cassette 28 in transit from the loader 22 to the drive system 26 is shown in FIG. 9c. As the cassette 28 is moved forward by the drive wheels 140, the cassette 28 will go past the cassette present sensor 34 which will send a signal to the tape drive 26 to activate its acceptor mechanism 27. If the acceptor 27 rejects the cassette 28 due to a misalignment or other problem, the loader will continue to try to present the cassette 28 to the acceptor 27 for a predetermined number of times. The standard drive acceptor 27 will physically remove the cassette 28 from the intermediate position between the loader 22 and the drive system 26 and move it into engagement with the read/write head of the tape drive 26. After the drive has removed the cassette 28, the cassette present sensor 34 will detect that the cassette 28 is gone, sending a signal through the engagement solenoid piston 157 to extend and retract the engagement assemblies 130 in preparation for the unload cycle. During this period, the drive will record or read the cassette 28. When the cassette 28 is fully recorded, the acceptor 27 of the drive will eject the cassette 28 when commanded to do so by the host.

FIG. 9c also shows a cassette 28 returning to the loader 22 from the drive system 26. When the acceptor 27 ejects the cassette 28, it moves over the cassette present sensor 34 signalling the engagement solenoid piston 157 to retract and cause the engagement assemblies 130 to close on the cassette 28. Advantageously, the drive ejects the cassette 28 with a spring action, so that the cassette 28 will return all the way into proximity with the drive wheels 140. The drive wheels 140 rotate in the opposite direction from the previously described load operation to retract the cassette 28 fully into the magazine slot 48. When the cassette-in-magazine LED 108 no longer communicates with the cassette-in-magazine phototransistor 109 across the corresponding cassette present through-hole 56, see FIG. 7, the cassette 28 has been fully unloaded and the loader 22 electronics signals the magazine lock solenoid 120 to release the magazine 24.

Figure 9D:
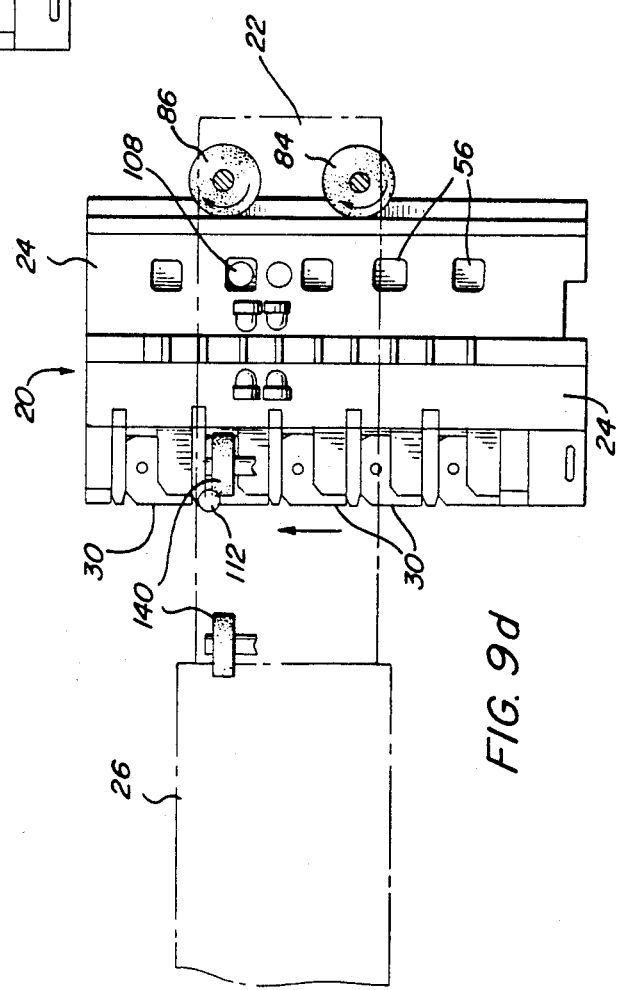
FIG. 9d shows the full cassette magazine of FIG. 9a with the magazine ascending past the second tape load/unload position within the loader.

The magazine drive motor 76 will then move the magazine 24 until the next slot 48 scheduled for cassette 28 transfer is vertically aligned with the tape drive aperture 33, as shown in FIG. 9d. The load and unload cycles, and the translation of magazine 24 as shown in FIG. 9c, will repeat until the cassette 28 in the fifth, or final, slot 48 is returned to the magazine 24. When this occurs, the two-speed magazine drive motor 76 moves the magazine 24 at high speed through the motion of its last gear up to the eject position.

The loading system 20 preferably, performs one cycle of cassette 28 unload and load in 8.5 seconds. One cycle being from the time a cassette 28 is removed from the drive system 26, retrieved into the magazine 24, the magazine 24 is indexed and a second cassette 28 is loaded into the drive system 26. The cassette loading system 20 has a reliability, or mean time before failure, of 20,000 cycles, or a useful life of five years.

In the preferred embodiment, the standard magazine 24 of the cassette loading system has a capacity of four to twelve R-DAT cassettes 28. When the cassette loading system is mounted to a tape drive 26 in accordance with a preferred embodiment, the system should be mounted in such a way that the magazine 24 does not hit the table during its translation when the drive/cassette loading system combination is mounted in the horizontal plane. The standard magazine's capacity of four to twelve cassettes 28 enables the drive to store up to 60.0 gigabytes of data, unattended by an operator, over a twenty four hour period. Thus, the entire operation can occur during non-working hours, leaving the host computer and drive free for use during working hours. Advantageously, unattended operation of the cassette loading system 20 occurs due to the automatic ejection of each cassette 28 by the tape drive 26 after it is fully recorded or read, followed by the operation of the cassette loading system 20. Magazines with capacities fewer than four or greater than twelve can also be accommodated.

The R-DAT tapes are also adapted to digitally record and play back audio materials. Consumers have in the past expressed a preference for audio components which are capable of playing a plurality of recordings, as seen by the one-time popularity of LP changers and the current popularity of CD changers. Accordingly, the cassette loader 22 can also be adapted to attach to a front loading R-DAT audio component.

It will be appreciated that certain structural variations may suggest themselves to those skilled in the art. The foregoing detailed description of the preferred embodiments and their operation and method of use is to be clearly understood as given by way of illustration, the spirit and scope of this invention being limited solely by the appended claims.

What is claimed is:

1. A cassette loading system, in a housing having an aperture, which delivers a plurality of cassettes one cassette at a time into a cassette drive, comprising:
   a cassette drive having a cassette acceptor;
   a cassette magazine, mounted through said aperture, said magazine defining a plurality of spaces, each of said plurality of spaces sized and shaped to receive a cassette, said magazine being adjustable within said aperture to align each of said plurality of spaces with said cassette acceptor of said drive;
   a non-mechanical cassette orientation sensor which determines if a cassette is inserted properly into each of said spaces if present therein; and
   a cassette transfer system which moves each of said cassette into said acceptor of said drive and retracts each of said cassettes upon ejection by said drive.

2. The system of claim 1, wherein said cassette orientation sensor comprises a cassette orientation LED and a cassette orientation phototransistor.

3. The system of claim 1, wherein said system is for loading cassettes having a chamfer thereon and wherein said cassette orientation sensor senses the presence of said chamfer.

4. The cassette loading system of claim 1, wherein said cassette orientation sensor comprises an LED/phototransistor pair positioned across said cassettes and blocked by any one of said cassettes improperly oriented in said magazine.

5. The cassette loading system of claim 3, wherein said LED/phototransistor pair communicates optically across a chamfer in each of said cassettes oriented properly.

6. The system of claim 1, wherein said drive includes a cassette presence sensor which signals the tape drive and loader regarding the cassette transfer status.

7. The system of claim 1, additionally comprising a cassette-in-magazine sensor which checks for the presence of a cassette in each of said plurality of spaces.

8. The system of claim 1, wherein said loader and drive form an integral component.

9. The system of claim 1, wherein the cassette loading system obtains power from a host computer system power supply.

10. The system of claim 1, wherein each space includes a cassette retainer clip.

11. The system of claim 1, wherein said magazine comprises a vertical flange disposed along a side thereof for guiding said magazine through said aperture or for locating the position of said magazine.

12. The system of claim 11, wherein said magazine comprises a vertical flange for locating the position of said magazine, additionally comprising a plurality of cut outs which serve as flags for magazine location.

13. The system of claim 1, additionally comprising a linear displacement assembly mounted in the loader for moving said magazine within said aperture.

14. The system of claim 13, wherein said linear displacement assembly comprises a motorized gear train culminating in a magazine drive wheel.

15. The system of claim 14, wherein said train is driven by a magazine drive motor which transfers motion to said magazine drive wheel at a final gear ratio of approximately 200:1 or higher.

16. The system of claim 15, additionally comprising a bearing surface having associated rollers, wherein there are at least two drive wheels and wherein said magazine drive wheels provide a force mirrored by said rollers.

17. The system of claim 1, wherein said transfer system comprises:
   a cassette transfer motor which is activated to cause motion which moves a cassette into and out of said acceptor;
   a plurality of cassette drive wheels which can engage a cassette to move said cassette into said acceptor of said drive and to retract a cassette upon ejection by said drive; and
   an engagement assembly which is activated in order to engage said drive wheels with a cassette in order to move a cassette into said acceptor or to retract a cassette upon ejection by said drive.

18. The system of claim 17, wherein said drive wheels comprise radial slits which provide additional traction when said wheels engage said magazine.

19. The system of claim 17, wherein said motion of said motor is in a first direction to move a cassette into said acceptor and in a second, opposite direction, to retract a cassette upon ejection by said drive.

20. The system of claim 17, wherein said transfer system additionally comprises a cassette drive wheel gear train and a timing belt to transfer said motion generated by said motor to at least one of said drive wheels.

21. The system of claim 20, wherein said cassette drive wheel gear train transfers motion generated by said motor at a final gear ratio of approximately 200:1 or higher.

22. A method of loading each of a plurality of cassettes into a cassette drive having a cassette acceptor, comprising:
   a. loading a cassette into each of two or more spaces in a magazine which is mountable through an aperture in a loader;
   b. mounting said magazine through said aperture;
   c. moving said magazine within said aperture to a position where one of said cassettes loaded in said magazine is roughly aligned with said cassette acceptor;
   d. more accurately aligning said one of said cassettes with said cassette acceptor through performing an up-and-down alignment sequence on said magazine;
   e. transferring said cassette into said cassette acceptor.

23. The method of claim 22, additionally comprising:
   f. ejecting said cassette from said cassette drive; and
   g. repeating steps (c) through (e) for another cassette.

24. The method of claim 22, wherein said loader includes a magazine drive motor which can be operated at a low speed and a high speed, and wherein step (c) comprises operating said motor at said high speed and step (d) comprises operating said motor at said low speed.

25. The method of claim 22, wherein said magazine comprises flags to identify the location of the magazine, additionally comprising determining the location of said magazine by sensing the location of said flags.

26. The method of claim 25, wherein said flags comprise cut outs on said magazine and said loader includes an LED/phototransistor combination, and wherein said determining step comprises detecting the position of said magazine by detecting the presence of one of said cut outs through said LED/phototransistor combination.

27. The method of claim 26, wherein there are two LED/phototransistor combinations, and wherein said determining step comprises moving said magazine up and down until each of said LED/phototransistor combinations detects the presence of one of said cut outs.

28. The method of claim 22, wherein said loader includes cassette transfer drive wheels and wherein step (e) comprises engaging said one of said cassettes with said drive wheels.

29. A loader for loading one or more cassettes into a cassette drive having a cassette acceptor, said loader being of the type having a magazine aperture and a magazine having a plurality of spaces therein mounted through said aperture, said magazine being adjustable within said aperture to align each of said plurality of spaces with said cassette acceptor on said drive, said loader comprising an engagement assembly and a plurality of cassette drive tires for moving a cassette mounted in a space within said magazine into said acceptor of said drive and for retracting a cassette upon ejection by said drive, said engagement assembly comprising:
   two link plates having narrow slots thereon;
   a bell crank pivotally mounted to said loader between said link plates and rotatably attached to said link plates;
   two sun gear shafts mounted on said loader at locations transversely spaced across said aperture;
   at least one swing arm pivotally mounted on each of said sun gear shafts to which a drive tire and a planetary gear are rotatably mounted; and
   a planetary gear shaft on each of said planetary gears extending through one of said narrow slots so that said planetary gear shaft is free to slide within the slot on each of said link plates, said sun gear shaft and said planetary gear shaft being located so as to cause said link plates to pivot about said sun gear shaft upon rotation of said bell crank due to contact between said slots and said planetary gear shafts thus moving said drive tires into engagement or disengagement on opposite sides of said cassettes.

30. The loader of claim 29, additionally comprising a cassette transfer motor which powers said engagement assembly.

31. The loader of claim 30, additionally comprising a cassette transfer gear train to transfer power from said transfer motor to said engagement assembly.

32. A cassette loading system, in a housing having an aperture, which delivers a plurality of cassettes one cassette at a time into a cassette acceptor of a cassette drive, comprising:
    a cassette magazine, mounted through said aperture, said magazine defining a plurality of spaces, each of said plurality of spaces sized and shaped to receive a cassette, said magazine being adjustable within said aperture to align each of said plurality of spaces with said cassette acceptor of said drive;
    a plurality of cut-outs in said magazine corresponding to each cassette space;
    a primary magazine position sensor; and
    a secondary magazine position sensor.

33. The cassette loading system of claim 32, wherein said primary and secondary position sensors each comprise an LED/phototransistor combination disposed across said cut-outs, both of said sensors are aligned with one of said cut-outs when one of said spaces is aligned with said acceptor.

34. The cassette loading system of claim 32, further comprising a magazine drive assembly in said housing having a two-speed motor which moves said magazine at a first speed for coarse movement and at a second speed, slower than said first speed, during a series of up-and-down movements whereby said spaces are aligned with said acceptor by incrementally aligning at least one cut-out with said primary and said secondary magazine position sensors with said up-and-down movements of said magazine.

35. The cassette loading system of claim 32, wherein said drive includes a cassette presence sensor which signals the cassette drive and loading system regarding the cassette transfer status.

36. The cassette loading system of claim 32, additionally comprising a cassette-in-magazine sensor which checks for the presence of a cassette in each of said plurality of spaces.

37. The cassette loading system of claim 32, additionally comprising a cassette orientation sensor which determines if a cassette is inserted properly into each of said spaces.

38. A cassette loading system, in a housing having an aperture with a front surface and a bearing surface, which delivers a plurality of cassettes one cassette at a time into a cassette drive, comprising:
    a cassette drive having a cassette acceptor;
    a cassette magazine, mounted through said aperture, said magazine defining a plurality of spaces, each of said plurality of spaces sized and shaped to receive a cassette, said magazine being adjustable within said aperture to align each of said plurality of spaces with said cassette acceptor of said drive;
    a cassette transfer system which moves each of said cassettes into said acceptor of said drive and retracts each of said cassettes upon ejection by said drive;
    a cassette retaining tab at a side of each space facing said acceptor enabling said loading system to operate in a horizontal as well as vertical orientation; and
    at least two drive tires located near the front surface of the aperture and configured to apply a rearward force on the magazine, so as to adjust the magazine relative to the aperture.

* * * * *